S. BERMAN.
AUTOMOBILE RADIATOR.
APPLICATION FILED APR. 12, 1919.
1,404,005.
Patented Jan. 17, 1922.
2 SHEETS—SHEET 1.
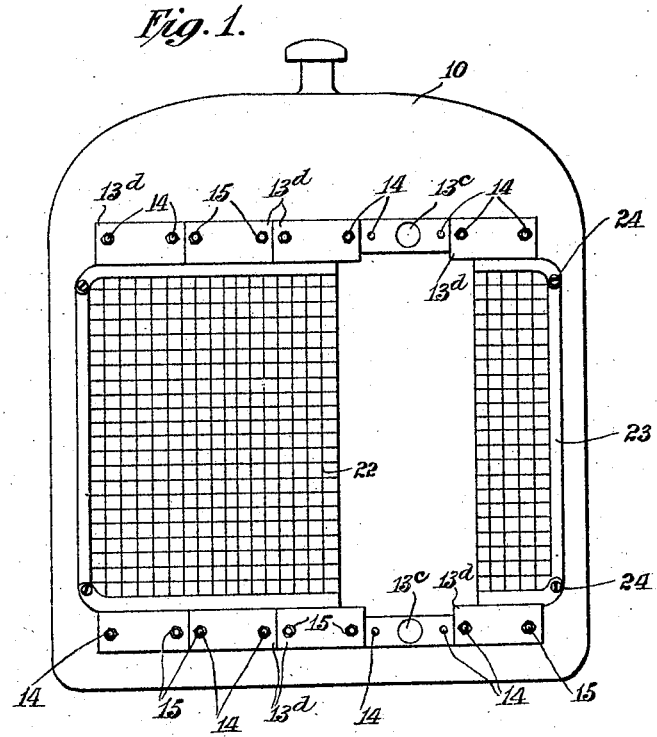
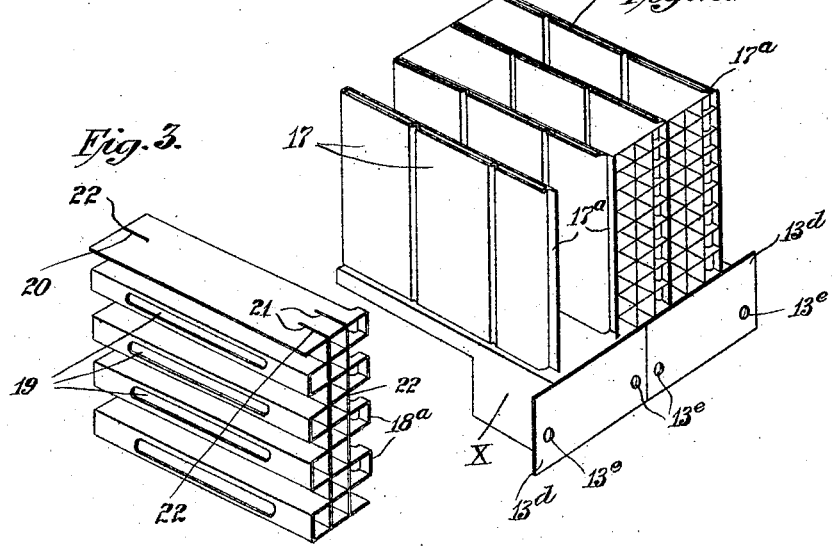
INVENTOR
Saul Berman
BY
ATTORNEY
WITNESS:

S. BERMAN.
AUTOMOBILE RADIATOR.
APPLICATION FILED APR. 12, 1919.
1,404,005.
Patented Jan. 17, 1922.
2 SHEETS—SHEET 2.
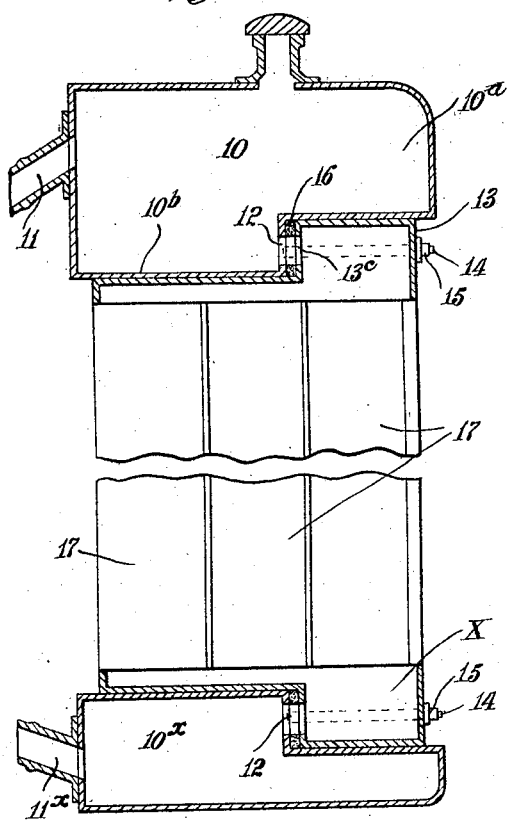
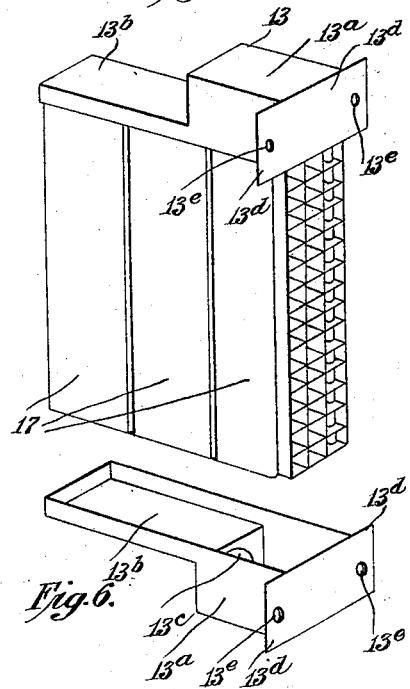
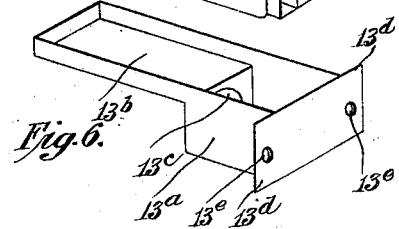
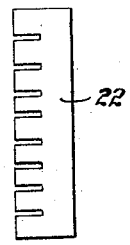
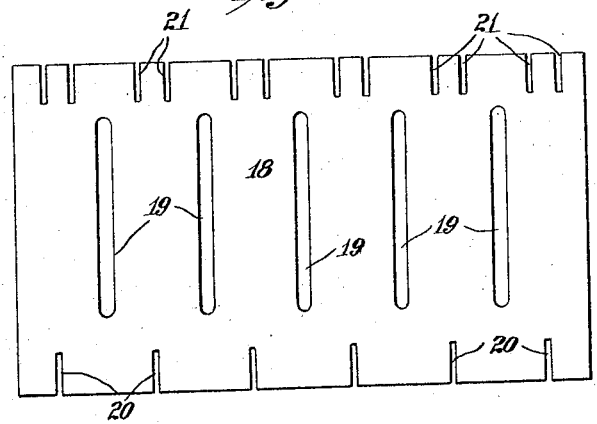
INVENTOR
Saul Berman
BY
ATTORNEY
WITNESS:

UNITED STATES PATENT OFFICE.

SAUL BERMAN, OF NEW YORK, N. Y.

AUTOMOBILE RADIATOR.

1,404,005. Specification of Letters Patent. Patented Jan. 17, 1922.

Application filed April 12, 1919. Serial No. 289,540.

*To all whom it may concern:*

Be it known that I, SAUL BERMAN, a citizen of the United States, residing at New York city, in the county and State of New York, have invented certain new and useful Improvements in Automobile Radiators, of which the following is a specification.

My invention relates to an improved automobile radiator and has for its object to simplify the construction of such devices, and to increase their efficiency.

The invention comprises a radiator structure including upper and lower removable tanks in communication with the radiator tank, tubes connecting the upper and lower tanks, and grids for supporting the tubes and contributing to the cooling action.

The invention is illustrated in the accompanying drawing, in which—

Fig. 1 is a front elevational view of an automobile radiator, certain of the grids and tubes being removed;

Fig. 2 is a perspective view of a number of tubes set in the lower tanks and a number of interposed grids;

Fig. 3 is a perspective view of one of the grids;

Fig. 4 is a vertical sectional view through the entire structure;

Fig. 5 is a perspective view of a grid with adjacent tubes and an upper tank thereon;

Fig. 6 is a perspective view of the lower tank;

Fig. 7 is a plan view of the blank from which the grid is formed; and

Fig. 8 is an elevational view of a reinforcing or strengthening comb for the grids.

Referring to the drawings, 10 denotes the permanent radiator tank having the inlet 11. The tank is provided with a plurality of outlets 12 only one of which is shown in the drawings formed in a vertical wall below the overhung portion 10$^a$ of the tank 10. Positioned beneath the tank 10 is a series of removable auxiliary upper tanks 13 each comprising a relatively deep box like portion 13$^a$ and a rearwardly extending relatively shallow portion 13$^b$. The auxiliary tanks 13 are assembled in relation to the permanent tank 10 in the manner shown in Fig. 4, the box 13$^a$ lying under the overhung part 10$^a$ of the tank 10 and the relatively shallow rearwardly extending part 13$^b$ of the auxiliary tank resting under the bottom rear wall 10$^b$ of the tank 10. Formed in the rear wall of the box 13$^a$ is an opening 13$^c$ which, when the device is assembled, will align with an outlet opening 12 in the permanent tank 10. The front wall of each auxiliary tank 13 is provided with lateral extensions 13$^d$ each having therein a hole 13$^e$ through which to pass rods 14 held by nuts 15 by means of which the auxiliary tanks are tightly secured in position. Interposed between the rear wall of the box like portion of the auxiliary tank and the lower front wall of the permanent tank is a gasket 16 to prevent leakage.

The lower auxiliary tanks are constructed precisely like the upper auxiliary tanks, one such lower tank being shown in Fig. 6, the lower tanks being reversed in position relatively to the upper tank when installed. The description given above of the upper auxiliary tank will apply to the lower auxiliary tank and will not be repeated.

In Fig. 4, the lower auxiliary tank is denoted generally by the character X and communicates with the lower permanent radiator tank 10$^x$ having the oulet 11.

Interposed between the upper and lower auxiliary tanks and communicating with both thereof is a plurality of series of flat tubes 17. These tubes may be attached to both the upper and lower auxiliary tanks as by being soldered thereto, or in any other suitable manner, and are additionally secured in position by means of the grids shown in perspective in Fig. 3. Each grid is preferably formed from a blank 18 (Fig. 7) said blank having transverse slots 19 in its body, spaced apart slots 20 at one longer edge thereof and slots 21 at its opposite longer edge. It will be noted that the slots 21 are formed in pairs, while the slots 20 are formed singly. The blank 18 is bent upon itself a number of times to form the grid of Fig. 3, so that the slots 19 are at the sides of the grid and the slots 20 and 21 are at opposite edges or ends of the grid. The comb 22 of Fig. 8 is employed by being inserted in the aligned slots 20 and 21 and acts as a brace or strengthening member for each grid. The comb is soldered or otherwise secured in position and three combs are preferably used for each grid, as shown in Fig. 3. A grid 18 is interposed between each two series of adjacent tubes 17, the tubes having their forward edges flattened or bevelled as shown at 17$^a$, and the grids having projecting ears or lugs 18$^a$ which overhang and engage the flat edges 17$^a$ of the tubes and act to prevent shifting of the latter. The connection is somewhat like a mortise and tenon joint. One or more grids may be apportioned to each pair of upper and lower auxiliary tanks, and the tanks, the grid or grids and the tubes lying at opposite sides of the grid may all be soldered together to form a removable unit as shown in Fig. 5, or the grids may be separately removable as shown in Fig. 2. I provide an additional fastening means for the grids and appurtenant parts in the form of a moulding 23 which is preferably a rectangular frame the parts of which are joined at the corners by pivots or pins 24. Such a unit may be removed from the radiator structure, in case of damage, by removing the frame 23 loosening the nuts 15 and slipping the unit out over the bolts or rods 14.

The water circulates through the device as follows:—It enters the permanent tank 10 through the inlet 11, then passes through the ports 12 and 13$^c$ into the shallow portion 14$^b$ of the upper tank down through the radiator tubes 17, then through the ports 13$^c$ and 12 at the bottom into the permanent lower tank 10$^x$ and through outlet 11$^x$. The grids 18 present a large air cooler surface which contributes by contact with the tubes to cooling the water as it passes through the tubes 17.

It will be noted that I provide a compact structure divided into units each of which may be removed and replaced independently of all others. All the parts may be struck up by dies and may thus be readily standardized.

What I claim is:—

1. An automobile radiator comprising radiator tubes having depressed seats at their forward edges, removable grids having ears overhanging and engaging the seats at the forward edges of said tubes, and a moulding consisting of pivotally interconnected sections engaging said ears to retain the structure in position.

2. In an automobile radiator having a radiator core consisting of a series of removable upper and lower auxiliary tanks having parallel tubes connecting said tanks and removable grids interposed therebetween, the assembling of which forms a removable unit thereof, connecting means comprising groups of four bolts each projecting from said radiator and entering openings in wings forming a part of each upper and lower auxiliary tank and secured by nuts turned down upon said bolts over said wings thereby permitting the removal of any unit from the front of the radiator without causing the remaining units to become inoperative.

In testimony whereof I have affixed my signature in presence of two witnesses.

SAUL BERMAN.

Witnesses:
 CLARICE FRANCK,
 SYLVIA LEOPOLD.